(12) United States Patent
Dang Van Nhan

(10) Patent No.: US 8,245,563 B2
(45) Date of Patent: Aug. 21, 2012

(54) SYSTEM FOR DETERMINING A SETPOINT ASSOCIATED WITH THE POSITION OF A PEDAL IN AN AUTOMOBILE

(75) Inventor: Christophe Dang Van Nhan, Villejuif (FR)

(73) Assignee: Renault s.a.s., Boulogne-Billancourt (FR)

( * ) Notice: Subject to any disclaimer, the term of this patent is extended or adjusted under 35 U.S.C. 154(b) by 80 days.

(21) Appl. No.: 12/740,862

(22) PCT Filed: Oct. 30, 2008

(86) PCT No.: PCT/FR2008/051958
§ 371 (c)(1),
(2), (4) Date: Jul. 8, 2010

(87) PCT Pub. No.: WO2009/056772
PCT Pub. Date: May 7, 2009

(65) Prior Publication Data
US 2011/0271736 A1 Nov. 10, 2011

(30) Foreign Application Priority Data
Oct. 30, 2007 (FR) ...................................... 07 58708

(51) Int. Cl.
*G01D 21/00* (2006.01)
(52) U.S. Cl. .............................. 73/1.79; 701/70; 701/29.1
(58) Field of Classification Search .................. None
See application file for complete search history.

(56) References Cited

U.S. PATENT DOCUMENTS

| 4,510,905 | A | * | 4/1985 | Leiber ............................ 123/360 |
| 4,745,542 | A | * | 5/1988 | Baba et al. ........................ 700/79 |
| 6,099,086 | A | * | 8/2000 | Feigel et al. ................ 303/113.4 |
| 6,157,887 | A | * | 12/2000 | Zittlau ............................ 701/70 |
| 6,209,966 | B1 | * | 4/2001 | Mies ................................ 303/3 |
| 6,216,067 | B1 | * | 4/2001 | Baeuerle et al. ............. 701/33.9 |
| 6,249,737 | B1 | * | 6/2001 | Zipp ............................... 701/70 |
| 6,390,565 | B2 | * | 5/2002 | Riddiford et al. ................. 303/3 |
| 7,805,232 | B2 | * | 9/2010 | Karnjate et al. ................ 701/70 |
| 2005/0173980 | A1 | * | 8/2005 | Bohm et al. ................... 303/155 |

FOREIGN PATENT DOCUMENTS

| DE | 19510522 | 9/1996 |
| DE | 102006017302 | 10/2007 |
| GB | 2 332 720 | 6/1999 |
| WO | 0114195 | 3/2001 |
| WO | WO 01/62569 | 8/2001 |

* cited by examiner

*Primary Examiner* — Hezron E Williams
*Assistant Examiner* — Mark A Shabman
(74) *Attorney, Agent, or Firm* — Oblon, Spivak, McClelland, Maier & Neustadt, L.L.P.

(57) ABSTRACT

A system for determining a setpoint associated with a position of a pedal in an automobile of type that includes two sensors each measuring a value associated with the pedal position. The system includes a mechanism capable of switching between a first and second state on a predetermined switching position of the pedal, and a mechanism generating the setpoint on the basis of the measures from the two sensors and of a current state of the switching mechanism. The generation mechanism is capable of selecting the measure corresponding to the smallest of the pedal positions when the switching mechanism is in the first state, and selecting the measure corresponding to the largest of the pedal positions when the switching mechanism is in the second state.

10 Claims, 4 Drawing Sheets

SYSTEM FOR DETERMINING A SETPOINT ASSOCIATED WITH THE POSITION OF A PEDAL IN AN AUTOMOBILE

FIELD OF THE INVENTION

The present invention deals with the field of setpoint generation in an automobile with electronic control.

More particularly, the present invention relates to the generation of a braking setpoint based on a pedal actuated by a driver, said pedal being decoupled from the brakes themselves. Such a decoupling is better known by the expression "brake-by-wire".

PRIOR ART

In electronically controlled braking, the braking setpoint received from the driver is determined by means of a system for measuring a quantity associated with the depression of the brake pedal (position of the pedal, depression travel, bearing force or other).

For obvious safety reasons, this measurement system has to continue to operate even when it exhibits failures. Systems have therefore been provided in which the measurement is made by a number of sensors in order to ensure redundancy and thus avoid having the failure of a single sensor disable the system.

The document WO 2001/62569 proposes a measurement system comprising two sensors measuring the position of the brake pedal. However, this system is not tolerant to the failure of one of these sensors only in the case in which it is possible to determine with certainty which of the sensors has actually malfunctioned. In practice, if the sensors deliver inconsistent measurements, it is difficult, with no other information, to determine which has actually failed.

The document GB 98 20463 proposes the measurement system comprising three sensors measuring the position of the brake pedal in order to eliminate the uncertainty concerning the identity of a failed sensor. In practice, when there is a sensor failure, two sensors remain, the measurements of which are consistent so that the system can continue to operate. However, the same uncertainty is found when two sensors have failed since it is not possible to determine which one is still functioning normally. Moreover, the main drawback to this system lies in its high cost.

EXPLANATION OF THE INVENTION

The aim of the present invention is to resolve the above-mentioned problem by proposing a system for determining a setpoint associated with the position of a pedal of an automobile that is less expensive and allows for a diagnosis of enhanced reliability when one or more of its elements have failed.

To this end, the subject of the invention is a system for determining a setpoint associated with the position of a pedal of an automobile, of the type comprising two sensors each measuring a quantity associated with said position. The system comprises means switching between first and second states on a predetermined switching position of the pedal and means of generating the setpoint as a function of the measurements from the two sensors and the current state of the switching means. The generation means are suitable for selecting the measurement corresponding to the smallest of the pedal positions when the switching means are in their first state, and the measurement corresponding to the greatest of the pedal positions when the switching means are in their second state.

In other words, there is, by virtue of the switching means, a third information item concerning the actual position of the pedal with respect to a predetermined position, making it possible to test the consistency of the measurements delivered by the sensors. This single information item does not have to be produced by a sensor but, for example, by a less costly switch element.

Furthermore, the comparison of the measurements from two sensors with the state of the switching means makes it possible to diagnose the failure of one, or even both, of the sensors, and the failure of the switching means themselves.

According to particular embodiments of the invention, the system comprises one or more of the following characteristics:

- the pedal is a brake pedal, and in that the first state is activated for pedal positions below the switching position, and the second state is activated for pedal positions above the switching position;
- it also comprises means of diagnosing the operating state of the two sensors and of the switching means according to signals delivered by the latter;
- the diagnosis means are suitable for diagnosing a failed sensor and that only it has failed if both:
  - the deviation between the positions corresponding to the measurements from the two sensors is above a predetermined first threshold value; and
  - when the switching means are in their state indicating a pedal position above the switching position, the position corresponding to the measurement from the sensor is below the switching position by at least a predetermined second threshold value and the position corresponding to the measurement from the other sensor is above the switching position by at least a predetermined third threshold value or, when the switching means are in their state indicating a pedal position below the switching position, the position corresponding to the measurement from the sensor is above the switching position by at least the predetermined third threshold value and the position corresponding to the measurement from the other sensor is below the switching position by at least the predetermined second threshold value;
- the diagnosis means are suitable for diagnosing that the switching means have failed and that only they have failed if both:
  - the deviation between the positions corresponding to the measurements from the two sensors is below a predetermined first threshold value; and
  - when the switching means are in their state indicating a pedal position above the switching position, the positions corresponding to the measurements from the sensors are below the switching position by at least a predetermined second threshold value, or, when the switching means are in their state indicating a pedal position below the switching position, the positions corresponding to the measurements from the sensors are above the switching position by at least a predetermined third threshold value;
- the diagnosis means are suitable for diagnosing a double failure or a total inconsistency between the signals delivered by the sensors and the switching means if both:
  - the deviation between the positions corresponding to the measurements from the two sensors is above a predetermined first threshold value; and when the switching means are in their state indicating a pedal position above the switching position, the positions corresponding to the measurements from the sensors are below the switching position by at least a predetermined second threshold value, or, when the switching means are in their state indicating a pedal position below the switching position, the positions corresponding to the measurements from the sensors are above the switching position by at least a predetermined third threshold value;

the setpoint generation means are suitable for triggering setpoint degraded modes in the event of failure of the sensors and of the switching means;

the pedal is a brake pedal, and when only one sensor is diagnosed as having failed, the setpoint generation means are suitable for selecting the maximum between the position corresponding to the measurement from the other sensor and the switching position;

the pedal is a brake pedal, and when only the switching means are diagnosed as having failed, the generation means are suitable for selecting the maximum of the positions corresponding to the measurements from the two sensors;

the pedal is a brake pedal, and when at least two elements out of the switching means and the two sensors are diagnosed as having failed, the setpoint generation means are suitable for selecting the maximum between the positions corresponding to the measurements from the two sensors and the switching position.

BRIEF DESCRIPTION OF THE FIGURES

The present invention will be better understood on reading the following description, given solely as an example, and in relation to the appended drawings in which identical references denote identical or similar elements, and in which.

DETAILED DESCRIPTION OF THE INVENTION

Figure 1:
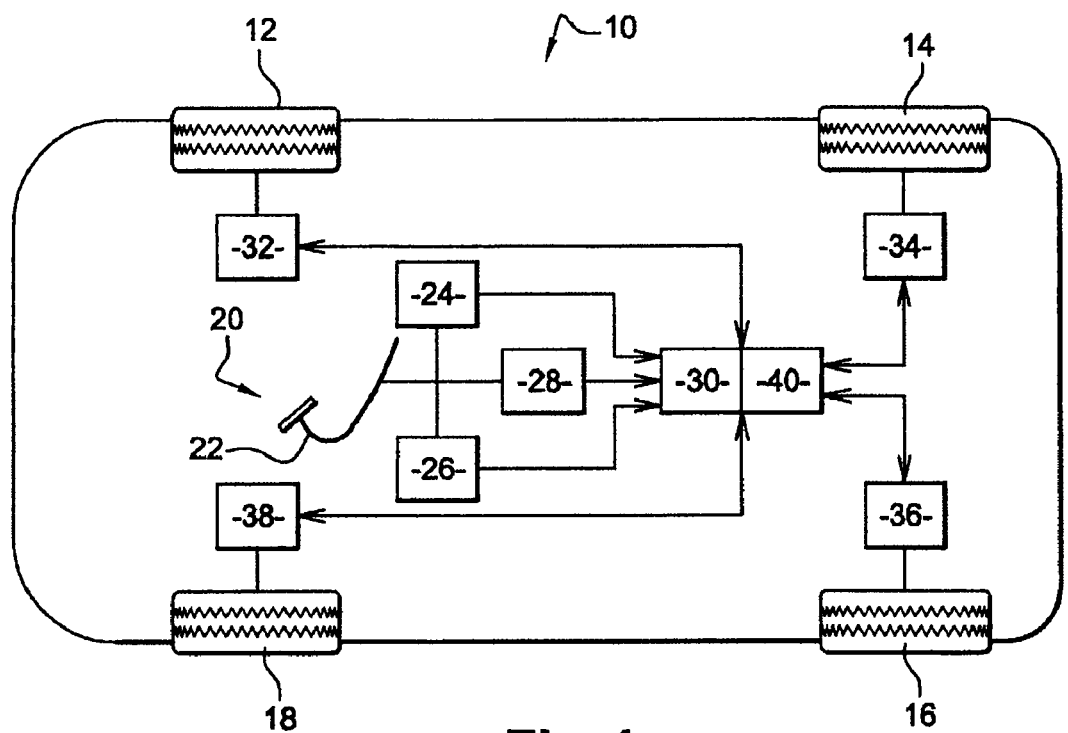
FIG. 1 is a schematic view of a system according to the invention associated with a brake pedal of an automobile equipped with an electronically controlled braking system.

In FIG. 1, an automobile 10 with four wheels 12, 14, 16, 18 comprises an electronically controlled braking system 20.

The braking system 20 comprises a brake pedal 22, actuated by the driver of the vehicle 10, two sensors 24, 26 measuring the position of the brake pedal 22, and a switch module 28.

The module 28 comprises a switch closing a circuit when the position of the brake pedal is above a predetermined value, hereinbelow designated "switching position". The module 28 thus delivers a first low value "LO" when the position of the brake pedal is below the switching position, and a second high value "HI" when the position of the brake pedal is above the switching position. For example, the module 28 is of the contact type for switching on the vehicle stop lights, as described in U.S. Pat. No. 1,750,279.

The braking system 20 also comprises a braking setpoint unit 30, connected to the sensors 24, 26 and to the switch module 28. The unit 30 generates a braking setpoint according to the outputs from the latter as explained in more detail hereinbelow.

Finally, the braking system 20 comprises braking devices 32, 34, 36, 38 for the wheels 12, 14, 16, 18 and a unit 40 controlling the latter. The control unit is connected to the braking setpoint generation module 30 and controls the devices 32, 34, 36, 38 according to the setpoint delivered by the latter. The devices 32, 34, 36, 38 and the control unit 40 are conventional and will not be described in more detail in the interests of conciseness.

Figure 2:
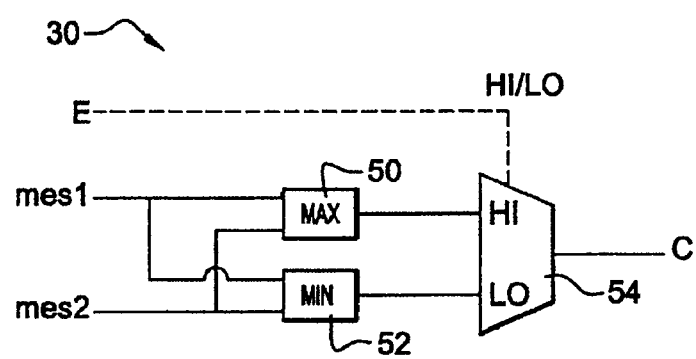
FIG. 2 is a schematic view of a first embodiment of the setpoint unit of FIG. 1.

FIG. 2 is a schematic view of a first embodiment of the braking setpoint unit 30.

The unit 30 comprises, in this embodiment, first and second selection means 50, 52 connected to the sensors 24, 26, the first means 50 selecting the maximum out of the measurements mes1, mes2 from the two sensors, and the second means 52 selecting the minimum from the measurements mes1, mes2.

The unit 30 also comprises third selection means 54 connected to the switch module 28 and to the first and second means 50, 52 and generating the braking setpoint C. The third selection means 54 select an output from the latter according to the value E delivered by the switch module 28. More particularly, the third means 54 select the output from the first means 50 when the value E delivered by the switch module 28 is the "HI" value and the output from the second means 52 when the value E delivered by the switch module 28 is the "LO" value.

The following setpoint generation logic is thus implemented by the unit 30:

when the switch module 28 indicates that the brake pedal is in a "very depressed" position (value E="HI") the braking setpoint C is equal to the greatest of the measurements delivered by the sensors 24, 26; and when the module 28 indicates that the brake pedal is in the "little or not depressed" position (value E="LO"), the braking setpoint C is equal to the smallest of the measurements delivered by the sensors 24, 26.

Thus, if one of the two sensors has failed, freezing its measurement at a value below the switching position of the switch module 28, then:

when the switch module 28 indicates that the brake pedal is in the "very depressed" position, the braking setpoint C follows the maximum of the measurements, and therefore that of the sensor that has not failed; and when the module 28 indicates that the brake pedal is in the "little or not depressed" position, the braking setpoint C follows the minimum of the measurements, which always allows braking to be able to be stopped. It may, however, result from braking less than the will of the driver in the region between the switching position of the switch module 28 and the value at which the measurement from the failed sensor is frozen. However, this can easily be controlled by the driver by depressing the brake pedal a little more, a natural reflex that is observed in the case of underbraking, in order to toggle the switch module to the "very depressed" state.

Similarly, if one of the sensors has failed by freezing its measurement at a value above the switching position of the switch module 28, then:

when the module 28 indicates that the brake pedal is in the "little or not depressed" position, the braking setpoint C follows the minimum of the measurements, and therefore that from the sensor that has not failed; and when the switch module 28 indicates that the brake pedal is in the "very depressed" position, the braking setpoint C follows the maximum of the measurements, which means that maximum braking is always available. It may, however, result from a braking greater than the will of the driver in the region between the switching position of the switch module 28 and the value at which the measurement from the failed sensor is frozen. However, this can easily be controlled by the driver by lifting the foot off the brake pedal, a natural reflex observed in the case of overbraking, in order to toggle the switch module to the "little or not depressed" state.

Moreover if the switch module has itself failed, for example it no longer switches between these two values "HI" and "LO", or it switches to a wrong switching position, the braking setpoint alternately follows the maximum and the minimum of the two position measurements. Since these two values are substantially equal for sensors that have not failed, tolerances apart, the braking setpoint remains correct.

It will thus be noted that the failure of a sensor does not cause braking setpoint generation to be disabled. Furthermore, a high safety level is preserved even in such a situation.

Figure 3:
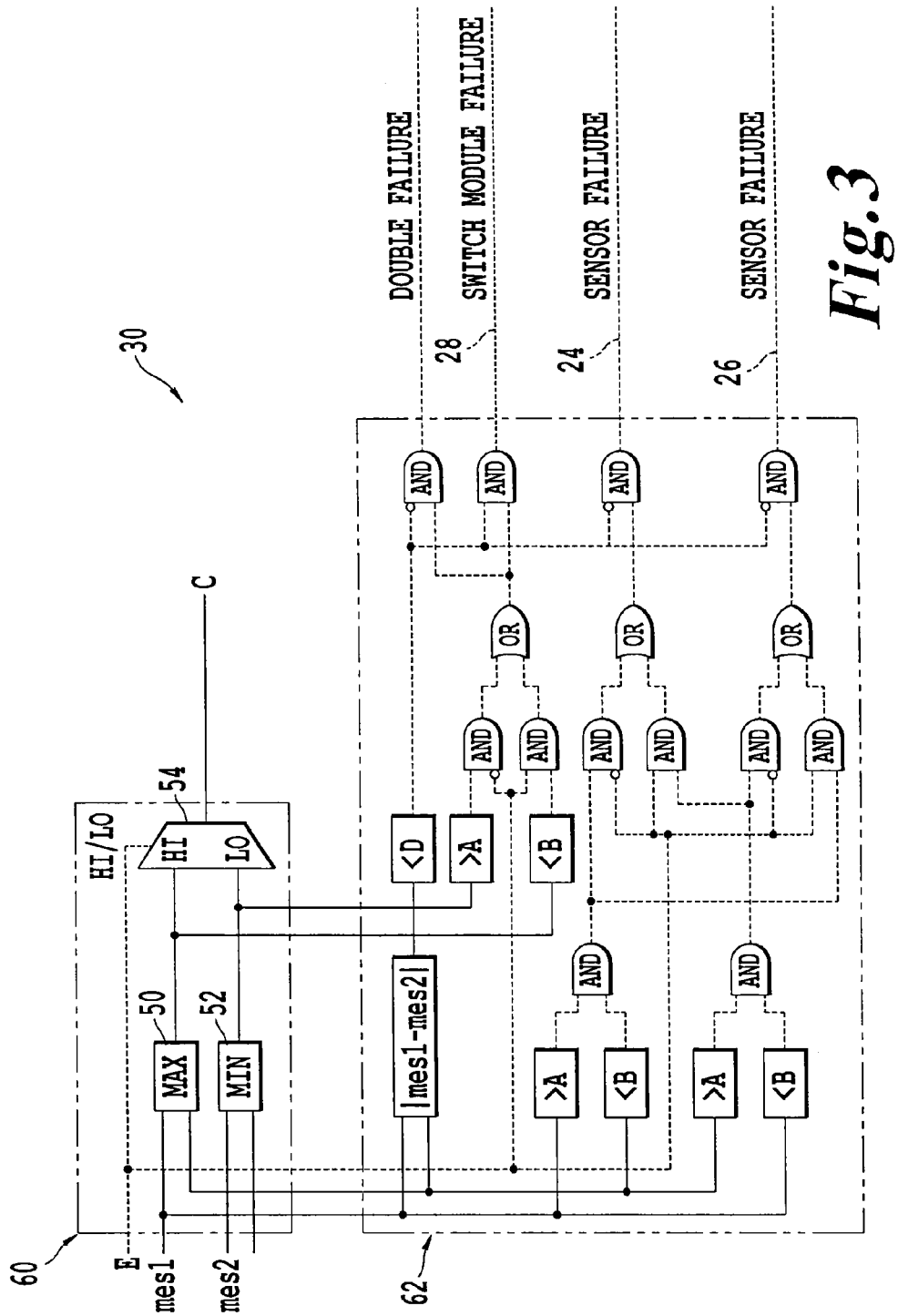
FIG. 3 is a schematic view of a second embodiment of the setpoint unit of FIG. 1.

In a second embodiment of the unit 30 illustrated in FIG. 3, a diagnosis of the operating state of the two sensors 24, 26 and of the switch module 28 is implemented according to signals delivered by the latter.

The setpoint unit 30 comprises a setpoint generation module 60, consisting of the selection means 50, 52 and 54 described in relation to the embodiment of FIG. 1, and a module 62 for diagnosing the operation of the sensors 24, 26 and of the switch module 28.

The module 62 implements the following diagnosis strategy, with A, B and D being positive predetermined parameters that take account of the behavior dispersions (manufacturing tolerance, wear, etc.) inevitably exhibited by the physical devices.

Figure 4:
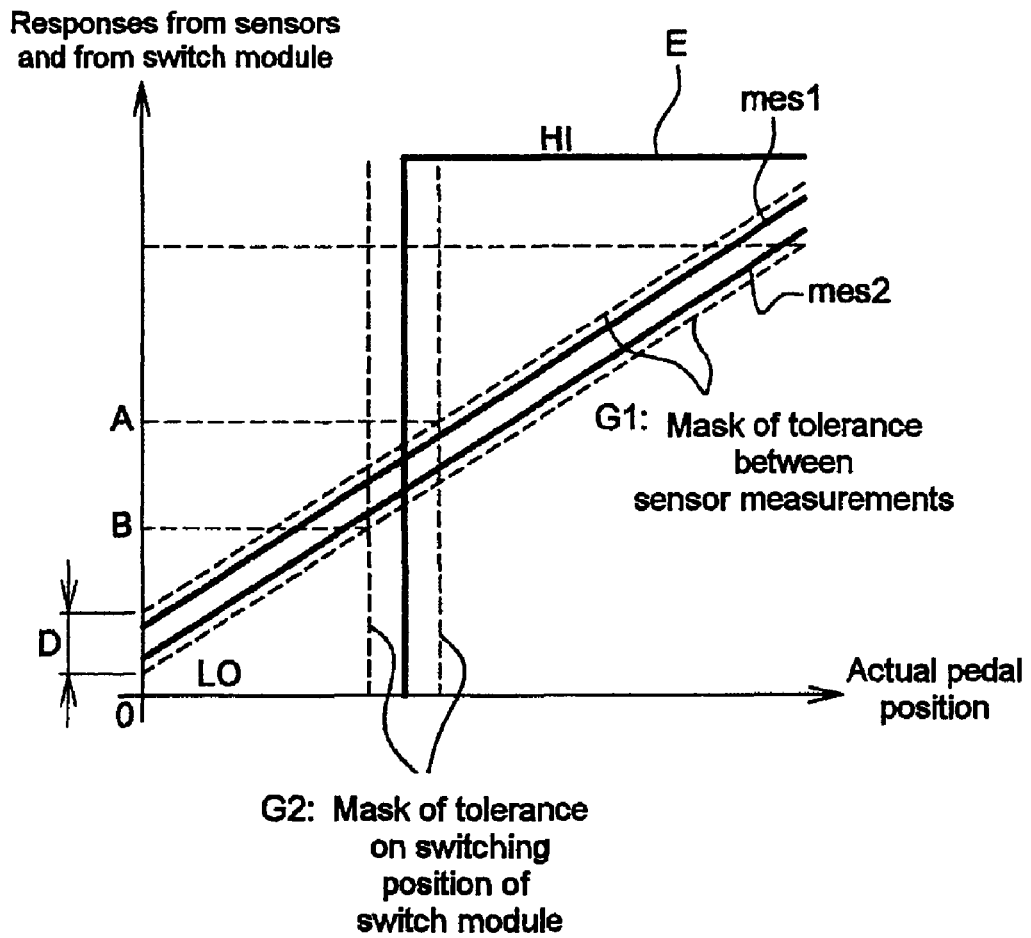
FIG. 4 is a plot illustrating tolerances in a diagnosis of failure of the sensors and of the switch of the system of FIG. 1.

More particularly, referring to FIG. 4 which illustrates the response of the two sensors 24, 26 and of the switch module 28 according to the actual position of the brake pedal, a first tolerance mask G1 is plotted, within which the measurements mes1 and mes2 from the two sensors 24, 26 are expected when the latter are operating normally, and a second tolerance mask G2 within which the actual switching position of the switch module 28 is expected when the latter is operating normally.

From these two masks G1, G2, the parameters A, B, D are deduced. More particularly:
- the parameter D is the difference between the high limit and the low limit of the first mask G1. This parameter is therefore a maximum acceptable difference between the measurements mes1, mes2 from two sensors 24, 26 when they have not failed. The parameter D thus defines a threshold of agreement or disagreement between these measurements;
- the parameter A is the point of intersection between the high limits of the two masks G1 and G2. This parameter is therefore a position value beyond which it is considered that the two sensors 24, 26 and the switch module 28 are returning consistent values if none of them has failed; and
- the parameter B is the point of intersection between the low limits of the two masks G1 and G2. This parameter is therefore a position value below which it is considered that the two sensors 24, 26 and the switch module 28 are returning consistent values if none of them has failed.

A failure of only the sensor 24 is thus diagnosed by the module 62 if:

---
(the difference between the measurements from the sensors is greater than D)
AND
(
  (
    (the switch module 28 indicates that the brake pedal is in the "little or not depressed" position)
    AND
    (the measurement from the sensor 24 is above A)
    AND
    (the measurement from the sensor 26 is below B)
  )
  OR
  (
    (the switch module 28 indicates that the brake pedal is in the "very depressed" position)
    AND
    (the measurement from the sensor 24 is below B)
    AND
    (the measurement from the sensor 26 is above A)
  )
)
---

Similarly, a failure of only the sensor 26 is diagnosed by the module 62 if:

---
(the difference between the measurements from the sensors is above D)
AND
(
  (
    (the switch module 28 indicates that the brake pedal is in the "little or not depressed" position)
    AND
    (the measurement from the sensor 24 is below B)
    AND
    (the measurement from the sensor 26 is above A)
  )
  OR
  (
    (the switch module 28 indicates that the brake pedal is in the "very depressed" position)
    AND
    (the measurement from the sensor 24 is above A)
    AND
    (the measurement from the sensor 26 is below B)
  )
)
---

Moreover, a failure of only the switch module 28 is diagnosed by the module 62 if:

---
(the difference between the measurements from the sensors is below D)
AND
(
  (
    (the switch module 28 indicates that the brake pedal is in the "little or not depressed" position)
    AND
    (the measurements from the two sensors 24, 26 are above A)
  )
  OR
  (
    (the switch module 28 indicates that the brake -continued

```
        pedal is in the "very depressed" position)
        AND
        (the measurements from the two sensors 24, 26
        are below B)
    )
)
```

Finally, a double failure or a total inconsistency between the signals delivered by the sensors 24, 26 and the switch module 28 is diagnosed by the module 62 if:

```
(the difference between the measurements from the
sensors is above D)
AND
(
    (
        (the switch module 28 indicates that the brake
        pedal is in the "little or not depressed"
        position)
        AND
        (the measurements from the two sensors 24, 26
        are above A)
    )
    OR
    (
        (the switch module 28 indicates that the brake
        pedal is in the "very depressed" position)
        AND
        (the measurements from the two sensors 24, 26
        are below B)
    )
)
```

The module 62 is connected to driver alerting means (not represented), such as, for example, a screen displaying a light indicator, an audible alerting means or other, to alert the driver to the diagnosed failures.

As can be seen, the diagnosis of the failures of the sensors 24, 26 and of the switch module 28 takes account of the dispersions normally observed in their operation.

Because of these dispersions, when at least one of the signals delivered by the sensors 24, 26 and the module 28 is situated between the values A and B, there is an uncertainty which renders the consistency tests between these signals ineffective. It may be that a failure is not instantaneously detected.

This is not, however, detrimental in as much as the driver acts on the pedal regularly and according to various configurations (releasing the pedal or braking to stop, in particular), so that, regularly, all the signals from the sensors 24, 26 and from the switch module 28 are situated outside the region of uncertainty between A and B, thus making an effective diagnosis possible.

Figure 5:
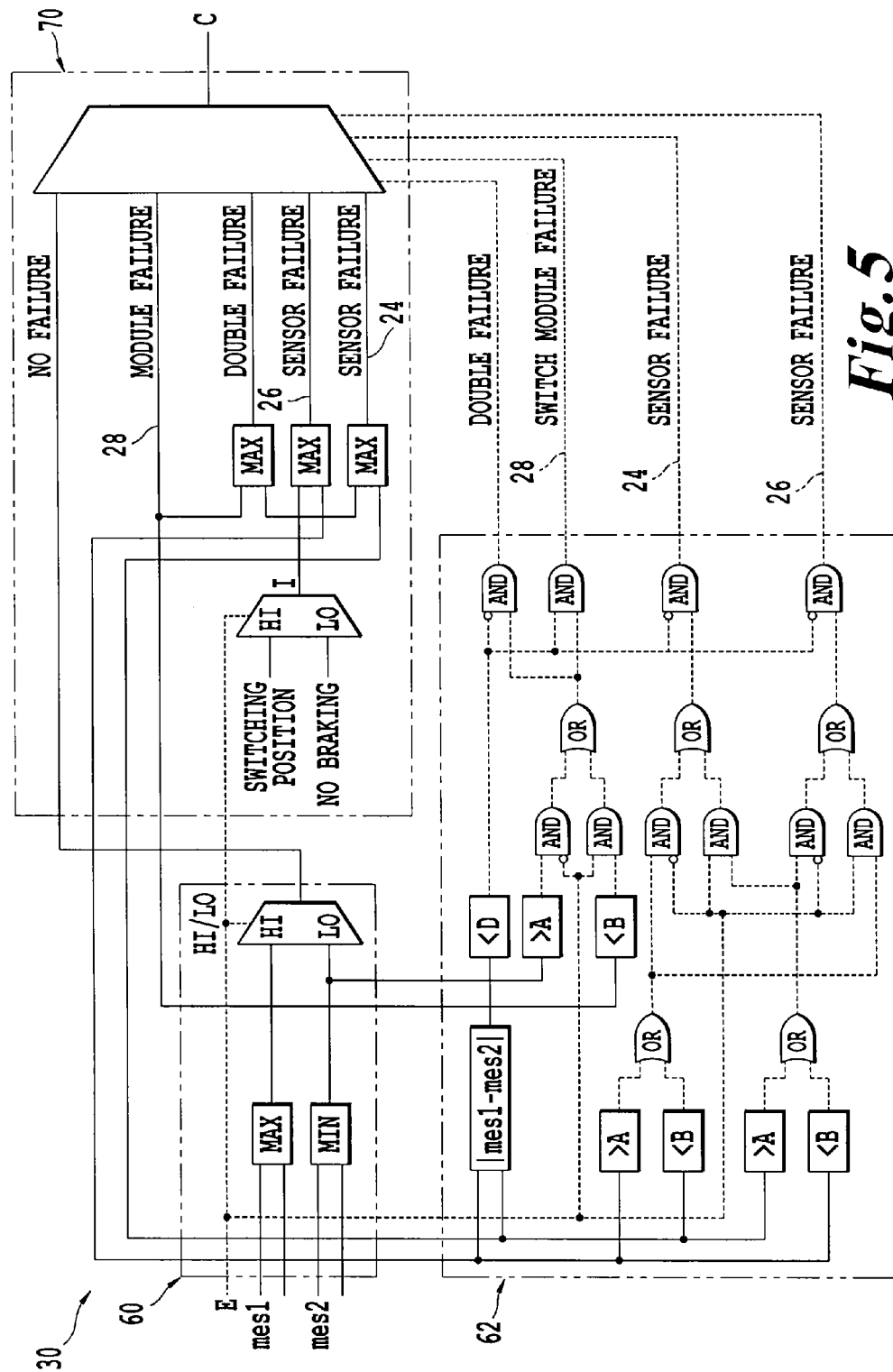
FIG. 5 is a schematic view of a third embodiment of the setpoint unit of FIG. 1.

A third embodiment of the setpoint unit 30 is illustrated in FIG. 5. This embodiment comprises a setpoint generation module 60 and a diagnosis module 62 that are identical to those of the second embodiment described in relation to FIG. 4.

In this embodiment, the setpoint generation module 60 is complemented by a module 70 which generates braking setpoints according to degraded modes when failures of the sensors 24, 26 and of the switch module 28 are diagnosed by the module 62.

The module 70 implements the following setpoint generation strategy in degraded modes.

If no failure is diagnosed by the module 62, the module selects, as the braking setpoint C, the setpoint produced by the module 60.

If a failure of the switch module 28 is diagnosed by the module 62, the module 70 selects as the braking setpoint the maximum of the measurements mes1, mes2 from the sensors 24, 26.

As long as none of the sensors 24, 26 has failed, the measurements from the latter are substantially equal (that is to say within the mask G1) and a reliable measurement of the pedal position is thus obtained. However, if one of the sensors has failed, the selection of the maximum of the measurements induces, in the worst case, an overbraking, overbraking being preferable to underbraking from the safety point of view. Furthermore, the driver is already alerted to a failure of the system for measuring the position of the brake pedal because of the diagnosis emitted by the module 62 upon the detection of the failure of the switch module 28. Thus, the case of a subsequent failure of one of the two sensors 24, 28 is improbable between the moment of emission by the module 62 of the failure of the switch module 28 and the moment when the driver sends his vehicle for repair.

If a failure of only one of the sensors 24, 26 is diagnosed by the module 62, the module 70 selects, as the braking setpoint C, the maximum between the measurement from the sensor that has not failed and a value I equal to the value 0 if the switch module 28 indicates a "little or not depressed" pedal position or equal to the switching position if the switch module 28 indicates a "very depressed" pedal position.

Thus, as long as there is no other failure, the braking setpoint C follows the measurement from the sensor that has not failed which is in all cases greater than or equal to the value "I".

Moreover, if, subsequently, the healthy sensor also fails with its measurement being frozen at a value "J" below the switching position, the braking setpoint C then switches between the value J at which the measurement from the sensor is frozen and the switching position of the switch module 28. This therefore makes it possible to always respond to a braking request with a braking setpoint that is acceptable according to the value of the switching position. Moreover, following a releasing of the brake pedal, there remains a residual braking corresponding to the value J, which can be controlled by the driver by using the vehicle's acceleration function, a reflex generally observed in the case of residual braking. It will thus be noted that, in the case of a double failure of the position sensors 24, 26, a high safety level is retained. Furthermore, the driver is already alerted to a failure of the measurement system following the diagnosis of the first failure observed on the sensors.

Similarly, if the healthy sensor also fails with its measurement being frozen on a value "K" above the switching position of the switch module 28, the braking setpoint C will also be frozen on the value K, independently of the state of the switch module 28, inducing, in the worst case, an overbraking, which is always preferable to an underbraking from the safety point of view. Furthermore, the driver is already alerted to a failure.

If a double failure or a total inconsistency between the signals delivered by the sensors 24, 26 and the switch module 28 is diagnosed by the module 62, the module 70 selects for the braking setpoint C the maximum of the measurements from the sensors 24, 26 and the value I defined hereinabove.

Thus, if the double failure relates to one of the sensors and the switch module 28, a high braking request, such as an emergency braking for example, on the part of the driver is always satisfied by the measurement from the healthy sensor which is then selected as the braking setpoint C.

If the double failure relates to the two sensors 24, 26 and their measurements are frozen at values below the switching position, the braking setpoint C then switches between the maximum of the measurements from the sensors and the switching position. This therefore always makes it possible to respond to a braking request with an acceptable level according to the value of the switching position.

If the double failure relates to the two sensors 24, 26 and their measurements are frozen at values above the switching position, the braking setpoint is then frozen on the maximum of these values, independently of the state of the switch module 28. In the worst case, there is therefore an overbraking, which is always preferable to an underbraking for safety reasons.

Thus, it will be noted that, whatever double failure is observed, which is an extremely rare case, including a simultaneous failure of the two sensors, a braking setpoint, at least equal to the switching position of the switch module 28, is generated. This is always preferable to a zero braking setpoint which is synonymous with the absence of braking.

In the embodiments that have just been described, brake pedal position sensors have been considered.

As a variant, any type of sensor can be used, provided that it delivers a monotonous and continuous measurement directly linked to the position of the brake pedal. Similarly, the two sensors can be of different types (for example, a force sensor and a pedal depression travel sensor) involving the use of formatting of the measurements delivered by the latter in order to obtain comparable values.

Similarly, a switch module has been described. It will be understood that any type of member suitable for exhibiting two states according to the position of the brake pedal, or of the depression travel, of the force exerted on the pedal, and so on, is suitable.

Moreover, a braking setpoint generation system based on a measurement on the brake pedal of an automobile has been described.

It will be understood that the invention applies equally to the generation of an acceleration setpoint according to measurement on the acceleration pedal. The generation logic is then preferentially reversed. Whereas, in the case of braking, a logic favoring overbraking is considered, in the case of acceleration, a logic favoring under-acceleration is considered. In such an application, the maximum-based selection functions are replaced with minimum-based selection functions.

The invention claimed is:

1. A system for determining a setpoint associated with a position of a pedal of an automobile, including two sensors, each measuring a quantity associated with the position of the pedal, the system comprising:
   means for switching between first and second states on a predetermined switching position of the pedal; and
   means for generating the setpoint as a function of measurements from the two sensors and of a current state of the switching means,
   wherein the generation means is configured to select the measurement from one of the two sensors corresponding to a smallest of the pedal positions measured by the two sensors when the switching means is in the first state, and the measurement from one of the two sensors corresponding to a greatest of the pedal positions measured by the two sensors when the switching means is in the second state.

2. The system as claimed in claim 1, wherein the pedal is a brake pedal, and the first state is activated for pedal positions below the switching position, and the second state is activated for pedal positions above the switching position.

3. A system for determining a setpoint associated with a position of a pedal of an automobile, including two sensors, each measuring a quantity associated with the position of the pedal, the system comprising:
   means for switching between first and second states on a predetermined switching position of the pedal;
   means for diagnosing an operating state of the two sensors and of the switching means according to signals delivered by the switching means; and
   means for generating the setpoint as a function of measurements from the two sensors and of a current state of the switching means,
   wherein when the diagnosing means has not diagnosed the sensors or the switching means as failed, the generation means is configured to select the measurement from one of the two sensors corresponding to a smallest of pedal positions when the switching means is in the first state, and the measurement from one of the two sensors corresponding to a greatest of the pedal positions when the switching means is in the second state.

4. The system as claimed in claim 3, wherein the diagnosing means diagnoses a failed sensor of the two sensors and that only the failed sensor has failed if both:
   a deviation between the positions corresponding to the measurements from the two sensors is above a predetermined first threshold value; and
   when the switching means is in the second state indicating a pedal position above the switching position, the position corresponding to the measurement from the failed sensor is below the switching position by at least a predetermined second threshold value and the position corresponding to the measurement from the other sensor is above the switching position by at least a predetermined third threshold value or, when the switching means is in the first state indicating a pedal position below the switching position, the position corresponding to the measurement from the failed sensor is above the switching position by at least the predetermined third threshold value and the position corresponding to the measurement from the other sensor is below the switching position by at least the predetermined second threshold value.

5. The system as claimed in claim 3, wherein the diagnosis means diagnoses that the switching means has failed and that only the switching means has failed if both:
   a deviation between the positions corresponding to the measurements from the two sensors is below a predetermined first threshold value; and
   when the switching means is in the second state indicating a pedal position above the switching position, the positions corresponding to the measurements from the sensors are below the switching position by at least a predetermined second threshold value, or, when the switching means is in the first state indicating a pedal position below the switching position, the positions corresponding to the measurements from the sensors are above the switching position by at least a predetermined third threshold value.

6. The system as claimed in claim 3, wherein the diagnosis means diagnoses a double failure or a total inconsistency between the signals delivered by the sensors and the switching means if both:
   a deviation between the positions corresponding to the measurements from the two sensors is above a predetermined first threshold value; and
   when the switching means is in the second state indicating a pedal position above the switching position, the positions corresponding to the measurements from the sensors are below the switching position by at least a predetermined second threshold value, or, when the switching means is in the first state indicating a pedal position below the switching position, the positions corresponding to the measurements from the sensors are above the switching position by at least a predetermined third threshold value.

7. The system as claimed in claim 3, wherein the pedal is a brake pedal, and, when only one of the sensors is diagnosed as having failed, the setpoint generation means selects a maximum of the positions between the position corresponding to the measurement from the other sensor and the switching position.

8. The system as claimed in claim 3, wherein the pedal is a brake pedal, and when only the switching means is diagnosed as having failed, the generation means selects a maximum of the positions corresponding to the measurements from the two sensors.

9. The system as claimed in claim 3, wherein the pedal is a brake pedal, and, when at least two elements out of the switching means and the two sensors are diagnosed as having failed, the setpoint generation means further selects a maximum between the positions corresponding to the measurements from the two sensors and the switching position.

10. A system for determining a braking setpoint associated with a position of a pedal of an automobile, comprising:
two sensors each configured to measure a quantity associated with the position of the pedal;
a switch module configured to switch between a first state and a second state based on a predetermined switching position of the pedal; and
a braking setpoint unit configured to generate the braking setpoint to control braking devices of the automobile, wherein
when the switch module is in the first state, the braking setpoint unit is configured to select the measurement from one of the two sensors that measures a smallest pedal position to generate the braking setpoint, and
when the switch module is in the second state, the braking setpoint unit is configured to select the measurement from one of the two sensors that measures a greatest pedal position to generate the braking setpoint.

* * * * *